(12) United States Patent
Martin, Jr.

(10) Patent No.: US 6,575,326 B2
(45) Date of Patent: Jun. 10, 2003

(54) GASKET VALVE

(76) Inventor: Tim Martin, Jr., P.O. Box 649, Lynden, WA (US) 98264

( * ) Notice: Subject to any disclaimer, the term of this patent is extended or adjusted under 35 U.S.C. 154(b) by 0 days.

(21) Appl. No.: 09/780,875

(22) Filed: Feb. 8, 2001

(65) Prior Publication Data

US 2001/0032849 A1 Oct. 25, 2001

Related U.S. Application Data

(60) Provisional application No. 60/180,914, filed on Feb. 8, 2000.

(51) Int. Cl.[7] ............................................... B65D 51/16
(52) U.S. Cl. ...................................................... 220/374
(58) Field of Search ........................ 220/203.03, 203.16, 220/203.18, 203.19, 373, 374, 367.1, 256.1

(56) References Cited

U.S. PATENT DOCUMENTS

| 4,081,107 A | 3/1978 | Martin, Jr. et al. |
| 4,127,216 A | 11/1978 | Martin, Jr. et al. |
| 4,541,544 A | 9/1985 | Martin, Jr. et al. |
| 4,693,393 A | * 9/1987 | DeMinco et al. ............ 220/374 |
| 5,960,980 A | * 10/1999 | Burke et al. ................. 220/374 |

* cited by examiner

Primary Examiner—Nathan J. Newhouse
(74) Attorney, Agent, or Firm—Robert B. Hughes; Hughes Law Firm, PLLC

(57) ABSTRACT

A venting closure assembly for and milk tank where there is an outside stainless steel cover and a venting closure member positioned beneath the cover. The venting closure member forms a circumferential seal around the periphery of the cover and in one form has a downward and outward flaring flexible skirt, which forms a peripheral venting channel. When there is a surge of product in the tank (e.g. caused by acceleration of the tank) the surge of liquid is forced upwardly against the closure member and takes a circumferential path to slowdowns the surge of milk. In another form, a two-piece closure member is employed.

10 Claims, 8 Drawing Sheets

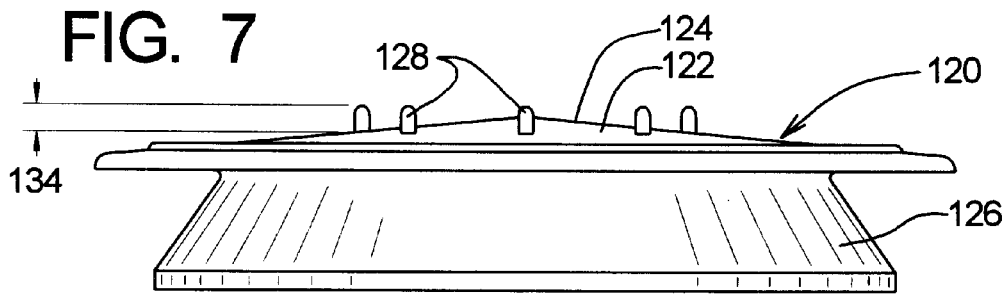
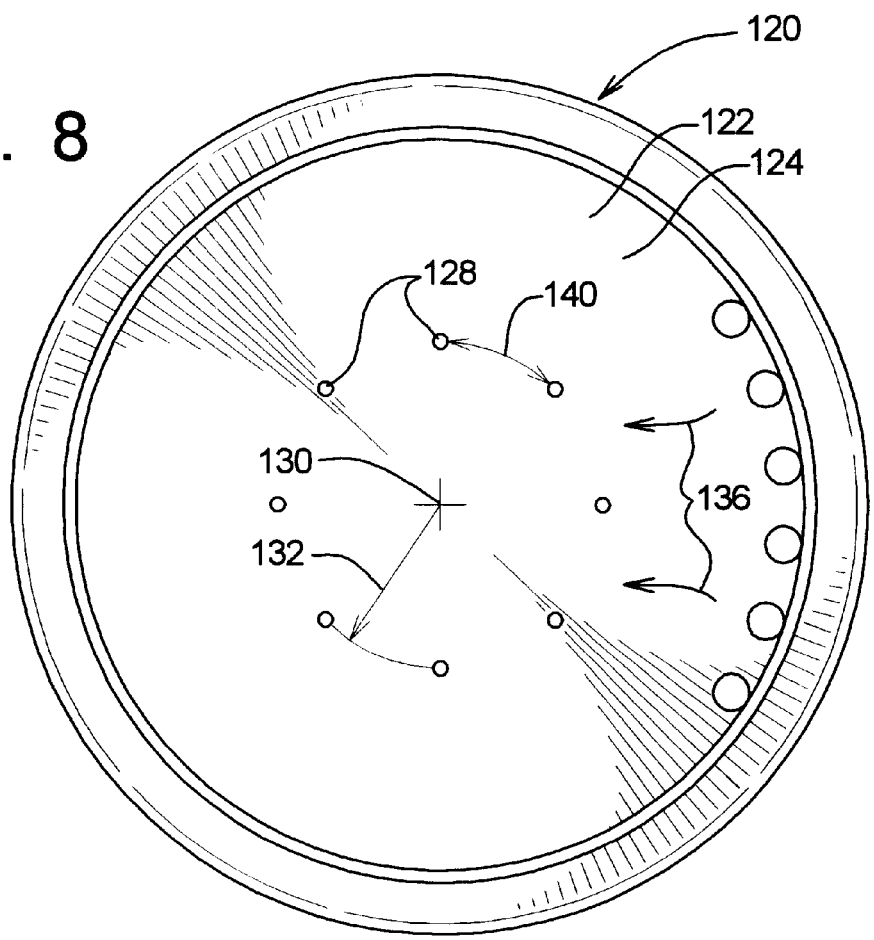

GASKET VALVE

RELATED APPLICATIONS

This application claims priority of U.S. Provisional Application Ser. No. 60/180,914, which was filed Feb. 8, 2000.

FIELD OF THE INVENTION

The invention relates to gasket valve assemblies that are adapted to be mounted to trucks containing fluid. Specifically, the present invention is particularly advantageous for milk trucks (where milk and milk products are herein referred to as "product"). In particular, the present invention relates to a system for allowing airflow to occur between ambient air and the interior portion of a tank. Further, the present invention is advantageous for addressing pressure surge.

BACKGROUND

In the dairy industry, milk is commonly transported from dairy farms to a central processing center by means of tank trucks and trailers. The milk-containing tank itself is generally made of stainless steel and is commonly of a double-walled construction with insulation between the inner and outer stainless steel walls, so that the contained milk can be kept at an adequately low temperature while being transported.

Because of the sanitation requirements of the dairy industry, the interior of the milk tank must be thoroughly washed at regular intervals. Also, it is necessary to provide the tank with an access opening, commonly called a "manhole", to permit an inspector to actually enter the interior of the tank. Obviously, while milk is being transported, this access opening must be properly covered both to prevent milk from being spilled out of the opening, and also to prevent outside contaminants from being mixed with the milk. There is a further requirement that the interior of the tank be vented to the outside atmosphere, since with an airtight tank even small temperature variations in the milk would cause undesired pressure differentials between the area inside the tank and the surrounding atmosphere.

A quite common means of providing the venting in a milk tank is to provide a venting member in an interior metal cover which normally closes the access opening of the tank. This venting member generally comprises a cylindrical tube mounted to the center of the cover and extending downwardly toward the interior of the tank. The interior of the tube is provided with a set of vertically spaced, staggered baffles which overlap sufficiently to define a circuitous passageway from the interior to the exterior of the tank. An annular gasket member made of a flexible material is usually placed between the perimeter portion of the cover and the support ring which defines the tank access opening, to provide a perimeter seal. Also, an exterior dust cover is positioned over the interior cover. The sanitation standards of the dairy industry require that all components which possibly come into contact with the milk be thoroughly cleaned at regular intervals.

While the prior art disclosure assembly described above has been able to perform the closing and venting functions for a milk tank in a manner to meet the standards of the dairy industry, there was a continuing need for improvement. Accordingly, there was conceived another venting closure arrangement for a milk tank, and various embodiments of this are disclosed in U.S. Pat. No. 4,081,107, issued Mar. 28, 1978, and U.S. Pat. No. 4,127,216 issued Nov. 28, 1978. In general, there is described in those patents a closure assembly where there is a venting closure member having perimeter flange members which fit against a support ring of the milk tank to form a circumferential seal and one or more circumferential venting channels. There is an outer cover having a vent opening which fits over the closure member and engages the peripheral portion thereof to form the circumferential seal against the support ring. The venting channel or channels connect to circumferentially spaced openings in the flanges to provide venting from inside the tank to the area outside the tank, while preventing both spilling of the milk and contamination from outside sources.

While the assembly described in the immediately preceding paragraph is believed to be a substantial improvement over the earlier closure assembly described above, and while this improved assembly in general has been found to function quite well in accomplishing its intended functions, it has been found that under certain circumstances it is possible for liquid in the containing chamber to pass out through the circumferential venting channel.

The main inner plate portion has an upper surface that is frusta-conical and slopes downwardly when traveling radially outwardly. The surface is at a desirable angle so the product that reaches the flow area will travel radially outwardly. This radial sloping of surface prevents product from pooling on the main inner plate portion. Product that is caught on the upper surface of the main inner plate portion can rise in temperature, which causes the product to spoil after a short manner of time. When a new surge of product is rushed to the flow area the spoiled product will then flow back into the main tank compartment.

Another advantage of having an angled plate is that it prevents product from being thrusted vertically out of the tank through the outside venting due to vibrations. When a milk truck travels the main inner plate portion vibrates. If product is trapped in the central portion this causes the droplets of the product to bounce out of the first outside venting structure. This splattering of product outside of the milk tank can be disruptive to other motorist.

Accordingly, it is an object of the present invention to provide an improved venting closure assembly for a milk tank which performs the closure function yet more reliably, while still permitting venting of the containing structure. It is yet another object to provide such a venting closure member that is able to meet the standards of sanitation and other requirements of the dairy industry.

SUMMARY OF THE INVENTION

A closure assembly for a containing structure told liquid product where the containing structure has a containing chamber for liquid and has an opening such as a manhole that is defined by a ring structure. The outside cover member has an outer perimeter portion that can be positioned adjacent to the ring structure. The outside cover further has an inner portion that extends to the perimeter portion and the inner portion has a vent opening that leads to the ambient atmosphere. The closure member is adapted to be positioned in an operating location adjacent to the cover. The closure member has an upper surface and a center location as well as a perimeter location. The upper surface has a positive slope (i.e. slopes downwardly) from the center portion to the perimeter portion the closure member further has an inner portion with an inner perimeter where a vertical extension is located. The inner perimeter is located below the first vent opening. The closure member has a relaxed position where the inner portion is spaced hourly from the first vent opening to permit airflow through the first vent opening. The closure member has an upwardly deflected position with an upper surge exerts force upon the closure member and the vertical extension of the closure member is positioned against the first vent opening but allows communication between the containing structure and the ambient air. The closure member further has a second vent opening spaced from the first vent opening and leading to a containing chamber to allow airflow to a from the containing chamber to an area between the cover member and the closure member. The venting closure member in its operating location and in its relaxed position in the containing chamber can be vented to ambient atmosphere and with a surge force exerted on the closure member the closure member moves to its upwardly deflected partially closed position to allow moderate flow of liquid outwardly through the first vent opening.

BRIEF DESCRIPTION OF THE DRAWINGS

FIG. 7 is a side view of a second embodiment of the present invention;

FIG. 8 is a top view of the second embodiment of the present invention;

DETAILED DESCRIPTION OF THE PREFERRED EMBODIMENT

Figure 1:
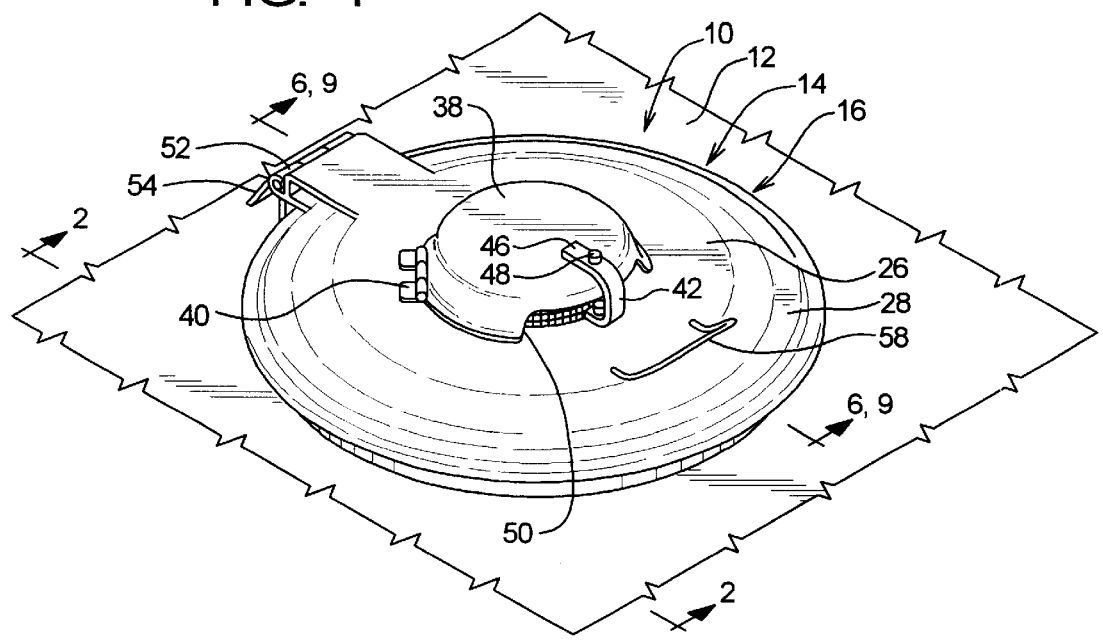
FIG. 1 is an isometric view of the venting closure assembly of the present invention, taken from a location above and to one side thereof.

Throughout this description reference is made to top and bottom, front and rear. The device of the present invention can, and will in practice, be in numerous positions and orientations. These orientation terms, such as top and bottom, are obviously used for aiding the description and are not meant to limit the invention to any specific orientation.

The present invention is particularly adapted to meet the sanitation requirements and other requirements for closing the manhole opening of a milk tank, and thus the present invention will be described in that particular environment. However, it is to be understood that within the broader scope of the present invention, there could be application beyond the use in the dairy industry where, for example, similar problems exist, such as those described hereinafter.

The closure assembly 10 of the present invention is mounted to a platform 12 that is positioned on the top of a milk tank, a portion of which is shown at 13, and which defines a milk containing chamber 13a. This assembly 10 comprises an outside cover 14, made of stainless steel or the like, and a venting closure member 16 made of a moderately flexible material, such as rubber or a molded plastic having the general characteristics of a rubber-like material.

The manhole opening which is to be closed is generally designated 18, and it is defined by a perimeter ring structure 20 extending upwardly from the platform 12 and having the general configuration of a shallow upstanding cylinder. This ring structure 20 has an upper perimeter edge 22 that is moderately rounded, and an inwardly facing circumferential side surface 24.

The outside cover 14 comprises a main inner plate portion 26, which extends across a major portion of the opening 18, and a perimeter portion 28. At the center of the plate portion 26, there is a first outside venting structure 30, made as an upstanding cylindrical flange 32 formed with a plurality of through openings 34.

Surrounding the cylindrical flange 32 is a porous filter material 36, which can be made of a porous woven material, an open cell plastic foam, or other material. There is a vent cover or lid 38 that is hinge mounted at 40 to the main plate portion 26 of the cover 14. This cover 38 is held in its down position by means of a flexible strap 42 bolted at 44 to the cover 14 and having a free end 46 formed with an opening to receive a closure finger 48 upstanding. from the cover 38 at a location spaced from the hinge 40. The vent cover 38 is formed with an arcuate cutout or opening 50 to permit the flow of air through the venting member 30.

The main cover 14 is hinge mounted at 52 to an upstanding mounting member 54 fixedly attached to the platform 12. The level of the hinge 52 is moderately above the level of the upper edge 22 of the ring structure 20.

Figure 2:
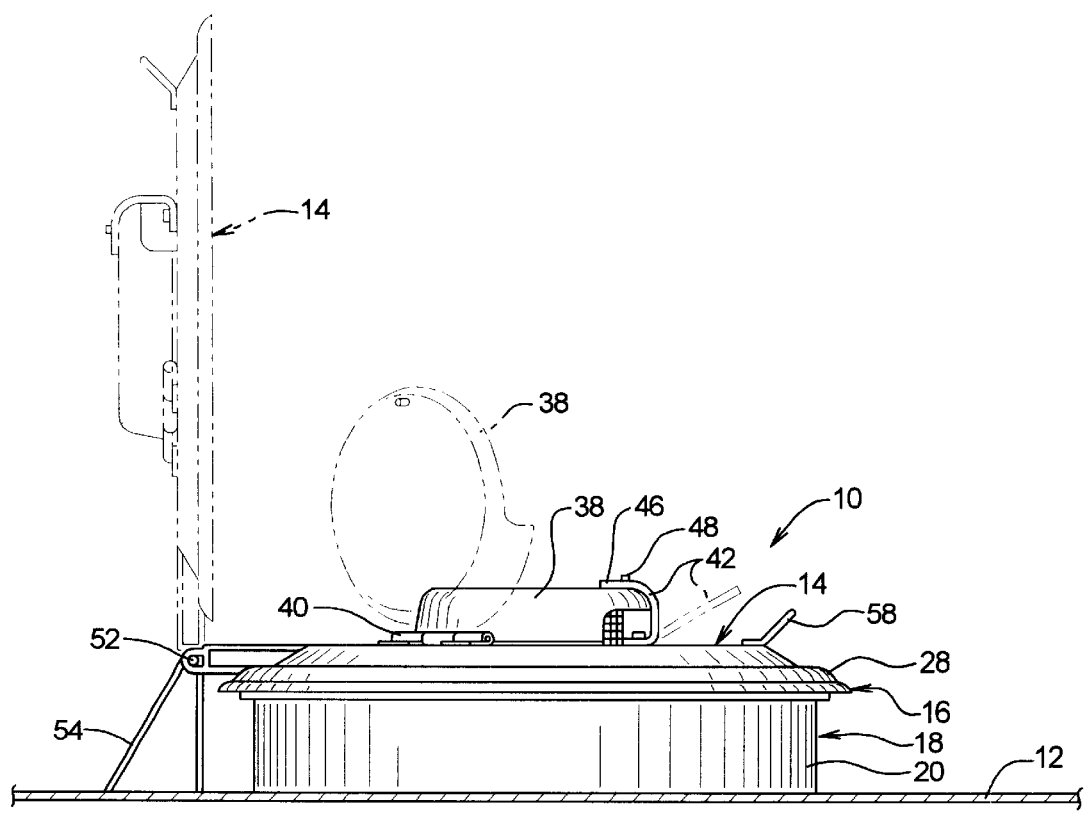
FIG. 2 is a side elevational view of the assembly of FIG. 2, showing in full lines the assembly in its closed position, and in broken lines the outer vent cover open, and the main outside cover open.

The perimeter portion 28 of the main outside cover 14 is made with a moderately down-turned lip 56 which extends radially just beyond the upper edge 22 of the ring structure 20. Also, the cover 14 has a handle 58 by which the cover 14 can be moved to its upper opened position, as shown in the broken lines of FIG. 2.

The aforementioned venting closure member 16 has a main inner plate portion 60, and a perimeter portion 62. The main inner plate portion has an upper surface 65 that is frusta-conical and slopes downwardly when traveling radially outwardly. The surface is at a desirable slope (3–10 degrees) so the product that reaches the flow area 80 will travel radially outwardly (this is further discussed below). This radial sloping of surface 65 prevents product from pooling on the main inner plate portion 60. When a milk truck travels there the main inner plate portion 60 vibrates. If product is trapped in the central portion this causes the droplets of the product to bounce out of the first outside venting structure 30.

Figure 6:
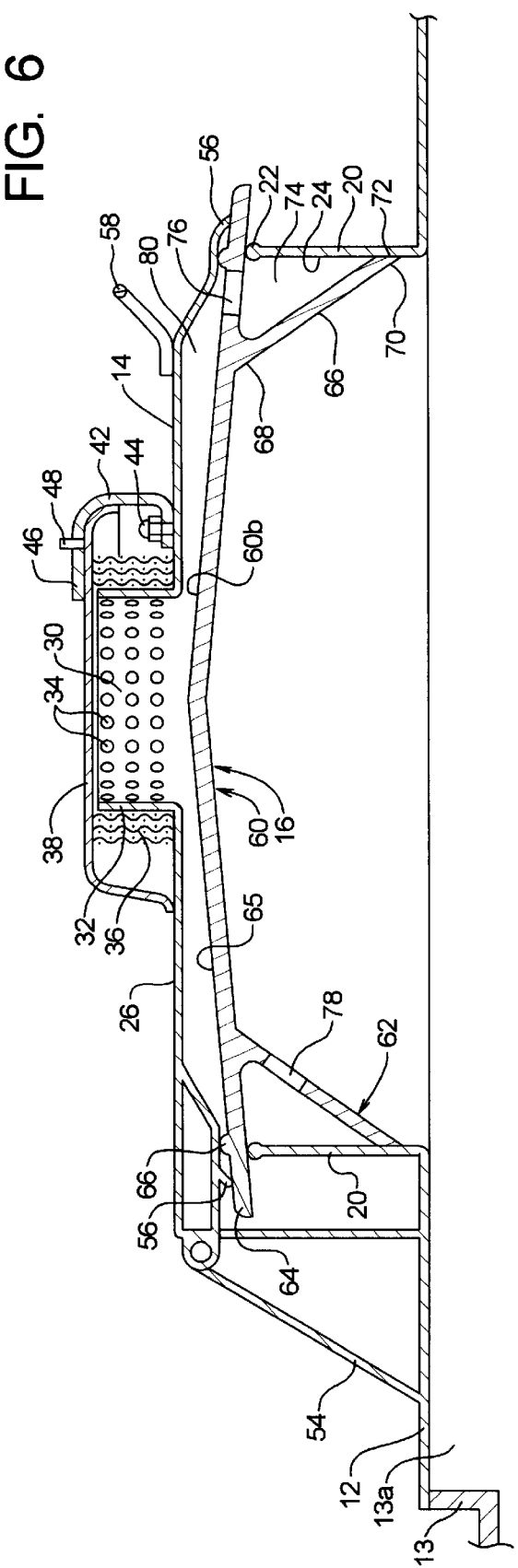
FIG. 6 is a sectional view taken along line 6—6 of FIG. 1 illustrating an inner closure member of the present invention in its relaxed position.

The perimeter portion 62 comprises a laterally extending perimeter flange 64, which can be made as a circumferential radially outward extension of the main plate member 60. When the closure member 16 is in its operating location (as shown in FIG. 6), the perimeter flange 64 extends a short distance beyond the upper edge 22 of the ring structure 20. Thus, with the outer cover 14 in its closed position, the perimeter portion 28 of the outer cover 14 presses against the flange 64 of the closure member 60 to form a peripheral seal around the edge 22 of the ring structure 20. The perimeter flange 64 has an upstanding annular lip or bead 66 positioned at the location of the upper edge 22 of the ring structure 20 to improve the sealing function of the perimeter flange 64.

The perimeter portion 62 also comprises a downwardly and outwardly extending, moderately flexible skirt 66 having a generally frusto-conical configuration. The upper edge 68 of the skirt 66 connects to the perimeter portion of the main plate portion 60, and is spaced radially inwardly from the location of the edge 22 of the ring structure 20 a moderate distance. The lower edge 70 of the skirt 66 has a radially outwardly extending contact surface 72 that fits against a lower portion of the inner surface 24. Thus, with the closure member 16 in its installed or operating position, as illustrated in FIG. 6, the skirt 66 forms with the ring structure 20 and with the radially inward portion of the flange 64 a circumferential venting passageway 74.

The flange 64 is formed with a through opening 76 at a location just radially outward of the skirt upper edge 68 and radially inward of the edge 22 of the ring structure 20. At a location diametrically opposite the location of the vent opening 76, there is a second vent opening 78 formed as a cutout or recess in the lower edge portion 70 of the skirt 66. Thus, the opening 78 is defined on one side by the adjacent surface 24 of the ring structure 20 and the portion of the skirt 66 at the location of the cutout.

Thus, it can be seen that the containing chamber 13 vents to ambient atmosphere through the opening 78, through the circumferential passageway 74, through the second vent opening 76, thence through a flow area 80 positioned between the main cover portion 26 and the main plate portion 60 of the closure member 16, and thence through the cover vent structure 30. Further, the closure member 16 is formed so that in its unstressed or relaxed position (i.e. its position when no external forces are applied thereto, except for the force of gravity), the outer portion 60a of the main plate portion 60 has outwardly of the location of the cover vent 30 a very slight upward and radially inward slope. The central portion 60b of the main plate portion 60 is additionally sloped to prevent any pooling of product in this area.

With the closure member 16 in its installed or operating position, as shown in FIG. 6, the central portion 60b of the plate member 60 of the closure member 16 is positioned a moderate distance below the lower edge of the venting cylinder 32 of the outside vent structure 30. The perimeter flange 56 of the closure member 16 is pressed with a moderate force by the perimeter portion 28 of the cover member 14 downwardly against the upper edge 22 of the ring structure 20 so as to form a peripheral seal. Thus, the only open path of communication is the aforementioned venting path, comprising the opening 28, the vent passageway 74, the opening 76, the flow area 80, and the holes 34 in the vent member 32.

To describe the operation of the present invention, the cover 14 generally remains attached by the hinge mounting 52 at all times to the mounting structure 54 that is in turn mounted to the plate 12. On the other hand, the closure member 16 can easily be removed from the ring structure 16 for periodic washing and be replaced in its installed position as shown in FIG. 6. The outer cover 14 can be provided with a suitable clamping device to hold it securely in its closed position of FIG. 6. For convenience of illustration, such a clamping device is not shown herein, but it is or may be of conventional design.

With the closure member 16 installed as shown in FIG. 6, and with the outside cover 14 closed, the main plate member 60 will normally be in its relaxed position so that the containing chamber 13 vents to the outside, as described above. Thus, if there is a change of temperature in the containing structure, so that air in the chamber 13 either expands or contracts, the containing structure 13a will not be stressed, because of the pressure equalization provided by the venting path, as described above. Further, with the arrangement of the outer venting structure 30, contaminants from outside will be prevented from passing through the filter material 36 and through the wall or flange 32.

With the containing structure 13 being a milk tank which is being moved by a vehicle along a highway, as the vehicle accelerates, and especially as the truck rapidly decelerates (such as during a strong application of the vehicle's brakes), the milk in the tank will tend to surge toward one end of the tank, so as to apply liquid pressure against a major portion of the upper surface of the tank. When the upward surge of liquid reaches the plate member 60, it pushes the central plate portion 60b of the closure member 16 upwardly against the lower edge of the cylindrical vent wall 32, closing off the venting structure 30 from communication with the tank interior 13a. A portion of the liquid or milk that surges may pass up the inner vent opening 78 and begin to flow through the venting passageway 74. Even if the surge is of sufficient duration and strength so that liquid passes through the vent passageway 74 and out vent passageway 76, the milk or other liquid is blocked from passing into the venting structure 30 by reason of the center plate portion 60b closing off the vent structure 30. When the surge subsides, the milk or other liquid flows by gravity flow back outwardly through the vent opening 78.

Further, with the skirt 66 being arranged in an outwardly and downwardly depending pattern, the surge of milk tends to force the skirt 66 in an upward and radially outward direction so as to improve the seal function of the skirt 66 against the ring structure 20.

Thus, it can be appreciated that the closure member 16 serves a number of functions. First, it functions as a gasket or seal to close the peripheral area at the location of the ring upper edge 20 and the peripheral portion 28 of the outer cover 14. Second, the closure member 16 performs a general closure function in that it provides an inner closure or cover in addition to the outer cover 14. Third, the closure member 16 provides a venting passageway, in the form of the opening 78, passageway 74, opening 76, flow area 80, and venting member 30. Fourth, the closure member 16 provides a temporary total closure of the vent path in a surge condition, by reason of the middle plate portion 60b moving upwardly by reason of the force of the surge to close off the vent structure 30. Fifth, in the event that any milk or other liquid does flow upwardly, possibly into the vent passageway 74 or even upwardly through the vent opening 76, there is a path for flow back into the containing chamber 30. Finally, the angled closure member 16 prevents pooling of product in the central portion inner plate portion 60.

The closure member 16 can be formed as one integral molded part. Further, it can be readily appreciated that the closure member 16 can easily be removed for washing.

As another possible modification, a filtration material can be placed in the venting passageway 74.

Figure 3:
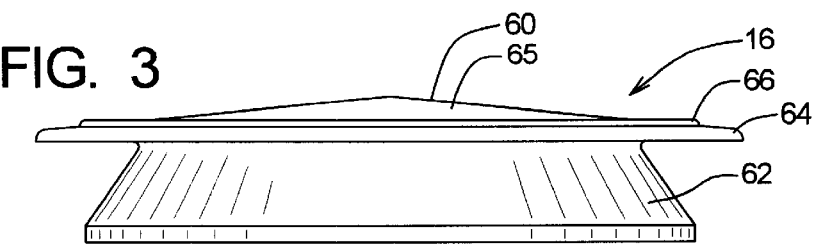
FIG. 3 is a side elevational view of the venting closure member
Figure 4:
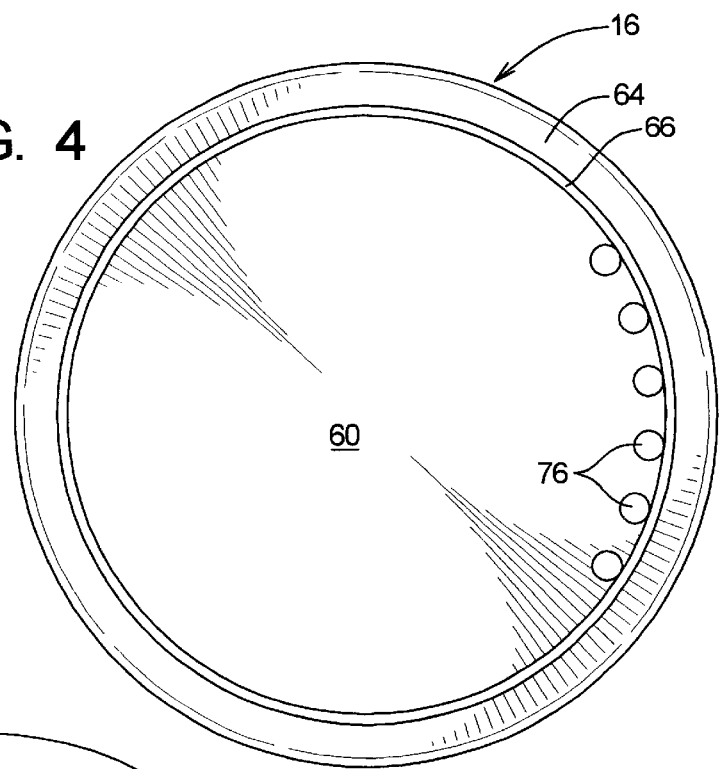
FIG. 4 is a top view of the venting closure member.
Figure 5:
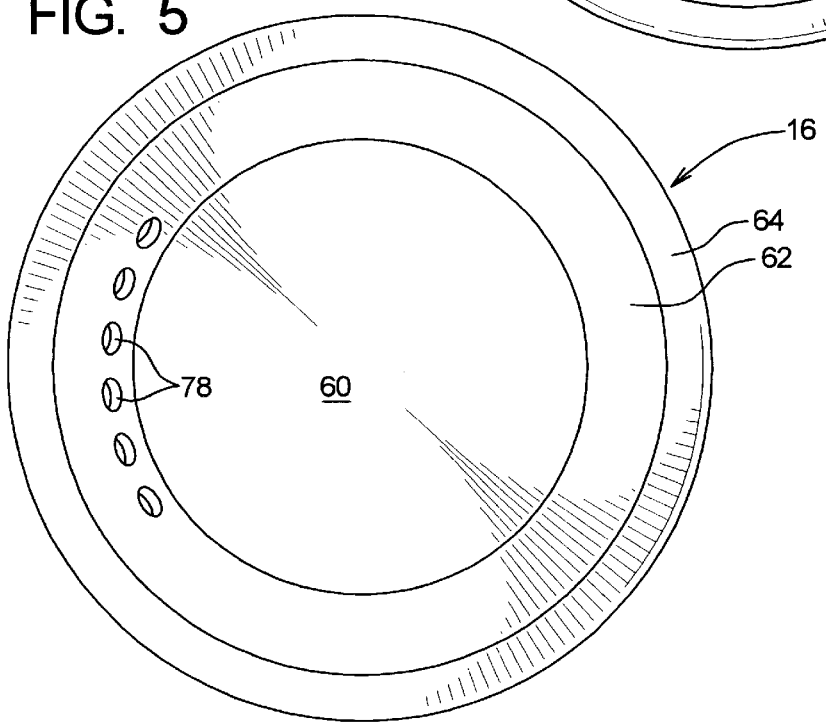
FIG. 5 is a bottom view of the venting closure member.

There will now be a discussion of the second embodiment of the present invention where in general, the second embodiment does not provide a complete seal between the tank region and and in air, but rather provides a substantial seal allowing radial flow of air and product to the venting enclosure. As shown in FIG. 7, the closure member 120 has a main interplate portion 122 having an upper surface 124. The upper surface 124 is frusto conical and slopes radially outwardly down as in the previous embodiment. As with the previous embodiment, the radially outward down slope of surface 65 prevents pooling of the product of the main interplate portion 122. The laterally extending perimeter flange 126 is similar as to the previous embodiment, further, the openings 76 and 78 have a similar configuration as the previous embodiments shown in FIGS. 3–5. Located on the upper surface 124, there are a plurality of vertical extensions 128. The vertical extensions can be integrally molded to the closure member 120 and are adapted to engage the lower surface of the main cover portion 26 (see FIG. 9). The vertical extensions 128 are positioned radially outwardly from the center point 130 of the closure member 120 a distance indicated at 132. Further, the vertical extensions 128 have a height indicated at 134 that defines an and radial passageways described further herein.

Figure 9:
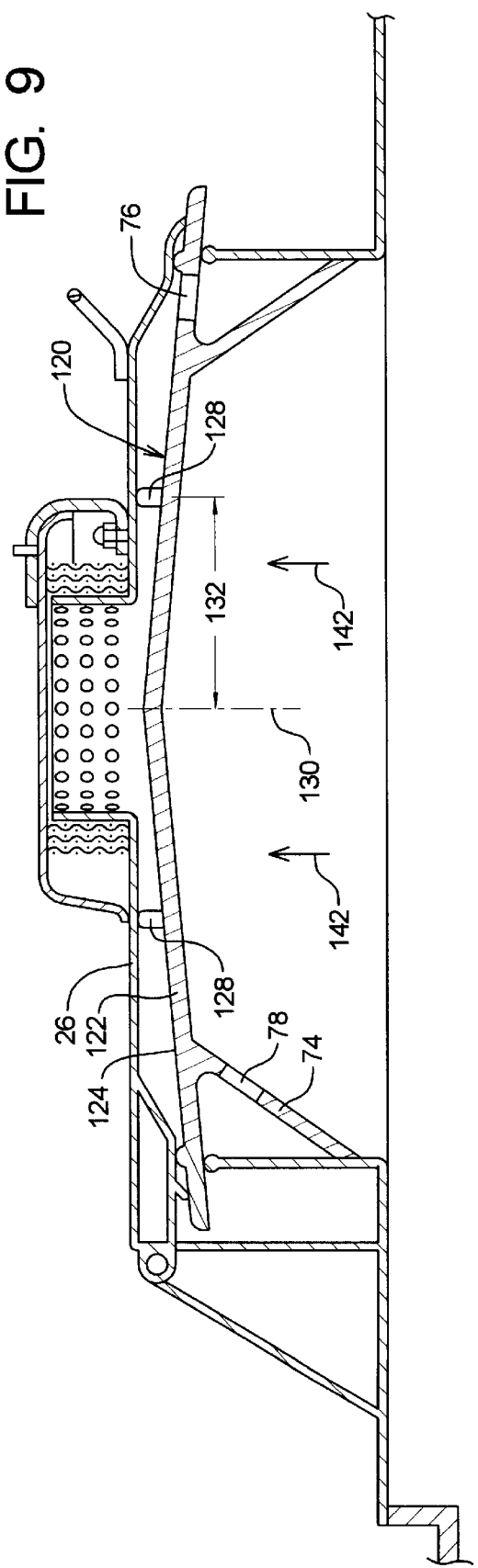
FIG. 9 is a sectional view taken at line nine—nine of FIG. 1.

As shown in FIG. 9, when a surge occurs and product creates a pressure upon the lower surface of the closure member 120, as described before, the product interest through the openings 78 and circumferentially extends around the chamber region 74 and passes through the second set of openings 76. Thereafter, the product can flow radially inwardly as indicated in FIG. 8 by arrows 136. The extensions 128 allow separation between the upper surface 124 and the lower surface of the cover portion 26. Therefore, product will continue to flow through the cover vent structure 30. This is particularly advantageous in situations where product surge occurs frequently and creates excessively high pressure is that the manhole structure or tank is not designed to handle. Therefore, this embodiment is advantageous to allow leakage of product in order to create less pressure within the liquid product tank. As shown in FIG. 8, the radial distance indicated at 140 multiplied by the height 134 creates a radial passageway open area. Of course this open area is subject to deflection of the interplate portion 122; however, the total open passageway area around the circumference between the vertical extensions 128 can be in your between one square inch—forty square inches in the broader scope, and four square inches—twenty square inches in a preferred range.

Figure 10:
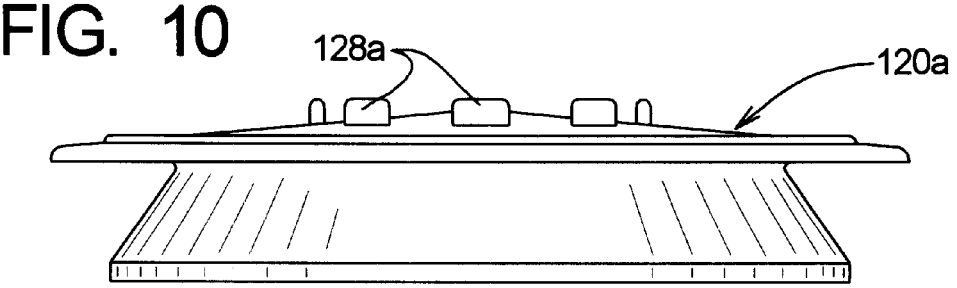
FIG. 10 is a side view of a third embodiment of the present invention.
Figure 11:
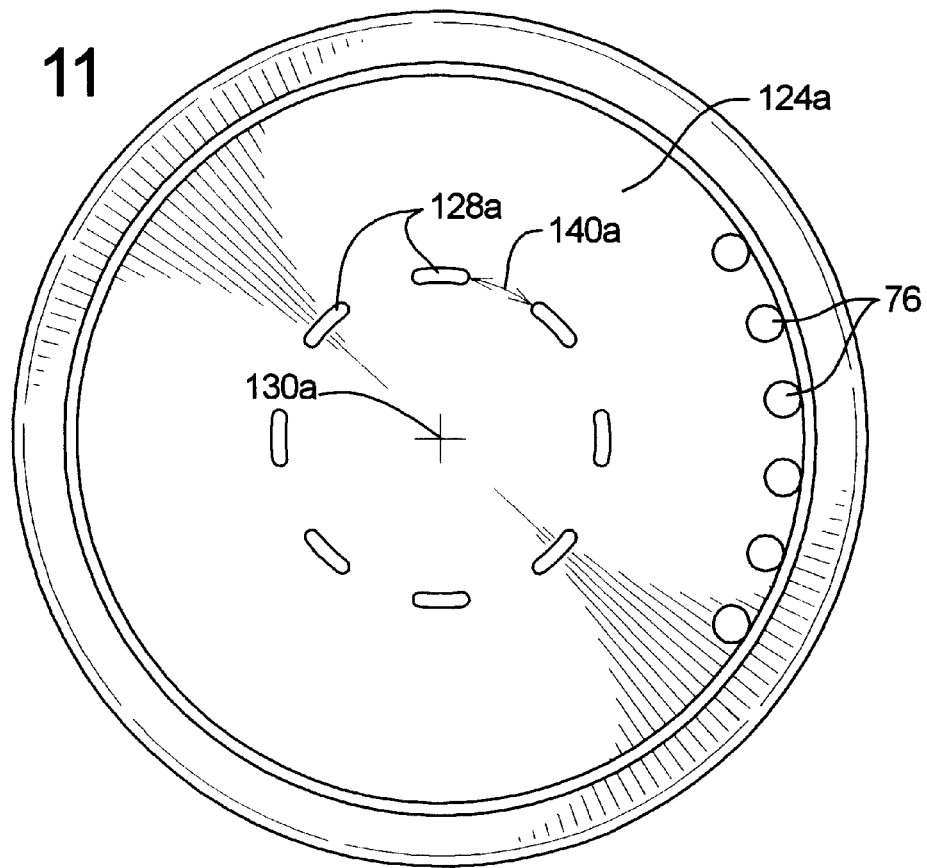
FIG. 11 is a top view of the third embodiment of the present invention.
Figure 12:
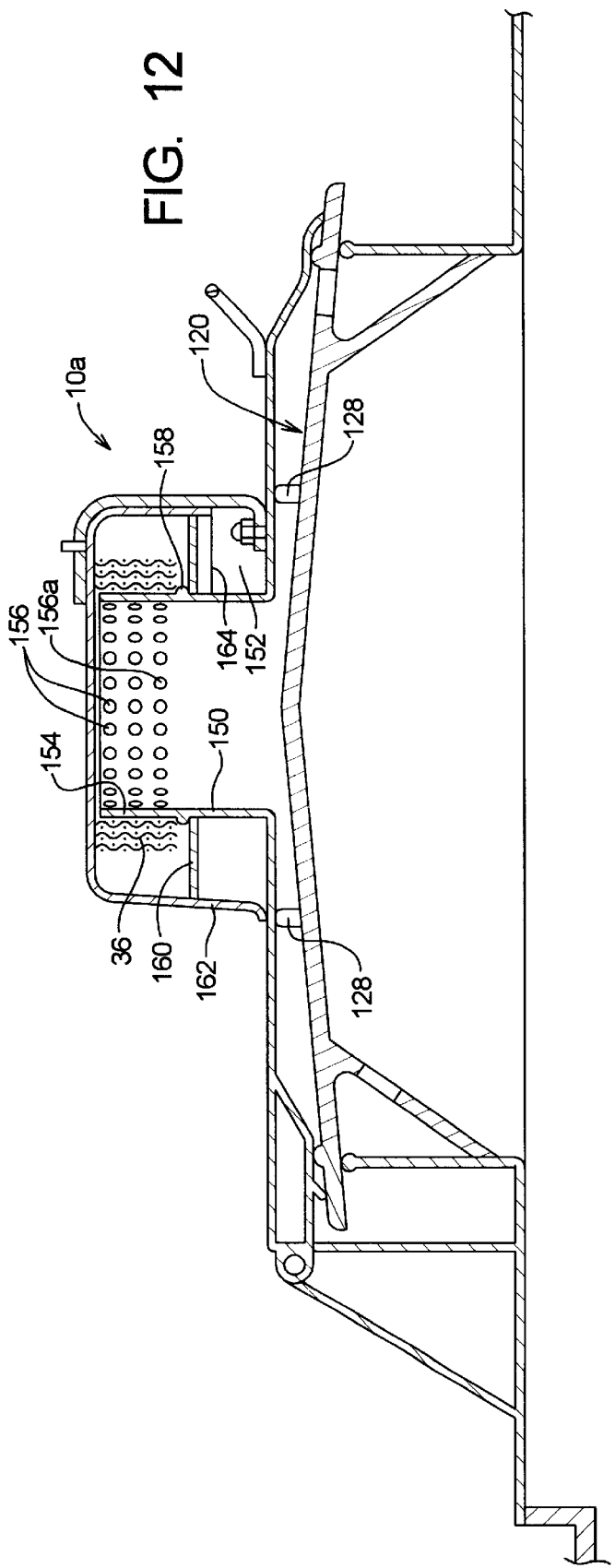
FIG. 12 is a modified cap region.

FIGS. 10–12 shows a variation of the second embodiment where the extensions 128a extend radially restrict the flow of product traveling radially inwardly. As shown in FIG. 10, there is a second embodiment of the closure member indicated at 120a. This embodiment, the extensions 128a and extend radially around an inner perimeter defined as to the location of the extensions 128a. This embodiment is advantageous for providing extra surface on the upper portions of the extensions 128a to engage the lower surface of the cover portion 26. Further, the radial open area indicated at 140a his reduced to provide a desirable net open area to allow product and air to pass therethrough. In other forms of this embodiment, the extensions 128 can be placed at 10 generally offset locations with respect to the radially outward placement of the extensions 128 or 128a from the center point 132 or 132a to create a serpentine flow between the extensions to partially inhibit the flow of product to allow sufficient flow to prevent a massive pressure buildup in the tank causing catastrophic failure.

As with the previous embodiments, the upper surface 124a has a positive slope which is defined as a downward slope from the center point 132a to the perimeter portion defined as the locations of the openings (or passageways) 76.

A further advantage of the embodiments shown in FIGS. 7–11, is that has a surge force occurs indicated by arrows 142, the extensions 128 prevent excessive deflection of the closure member 120 and hence the perimeter portion 62 maintains contact with the inner surface 24.

FIG. 12 shows a variation of the closure assembly 10a where the interior cylinder 150 extends vertically passed an annular open region indicated at 152 to provide less accessible access to the product inside the tank.

The interior cylinder 150 has an upper portion 154 that has a surface defining a plurality of openings 156. Below the openings is an annular flange 158 that is adapted to support a porous filter 36. A flexible annular member 160 is positioned around the outer surface of the interior cylinder 150 where the radially outward portion 162 is adapted to be displaced vertically up or down to allow air or product to flow therearound. The open region 152 has ridge portion 164 defining the upper perimeter of the open region 152. The bottom portion of the bottom row of openings 156a is positioned vertically above the ridge portion 164 so it is very difficult for any individual or animal to get access to the tank through openings 156.

In one form of implementation, the closure member 120 can be positioned in the manner as shown in FIG. 9 and the relaxed position as well as in the operating location. In this form, the interplate portion 122 does not substantially deflect when a product surge occurs. Hence, the closure member 120 is made from a flexible material and provides the benefits of installing, manufacturing and handling a flexible closure member 120; however, in operation the closure member 120 does substantially vertically displace.

Figure 13:
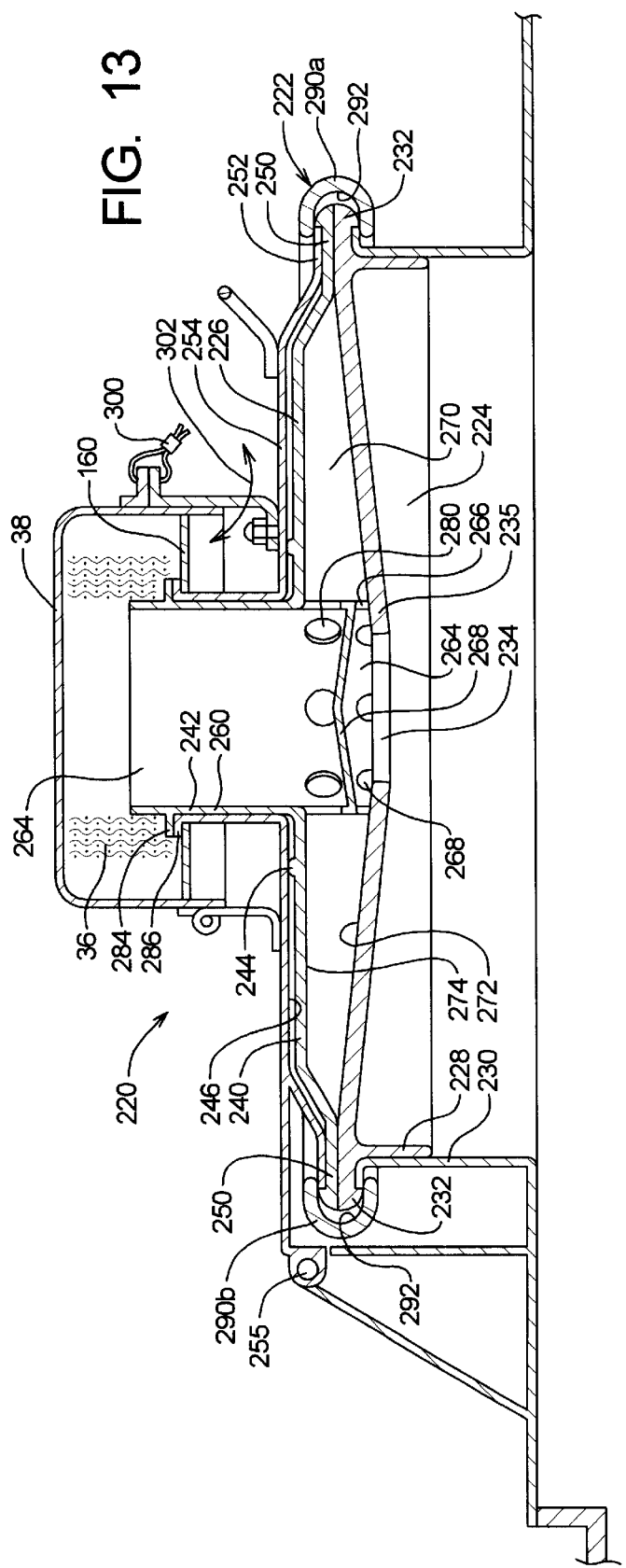
FIG. 13 is a second embodiment of the closure member.

FIG. 13 shows another embodiment that is similar to venting closure assembly 10 as shown in FIG. 12. The embodiment shown in FIG. 13 has a two-piece closure member indicated at 220 and a circumferential clamping mechanism 222. The closure member 220 comprises a first member 224 and a second member 226. The first member 224 is preferably a unitary structure and comprises an annular flange 228 that in the preferred form extends downwardly and engages the wall 230 to maintain a seal when a pressure surge occurs. The first member 224 further comprises a laterally extending flange member 232 that is adapted to extend beyond the upper portion of the cylindrical wall 230. The first member 224 further has a central opening 234 that has a diameter which is smaller than the opening of the central piece of the second member 226 described further herein.

The second member 226 is preferably a unitary structure and comprises a substantially horizontal planar section 240 and a central column section 242. The planar section 240 comprises annular bumps 244 that are adapted to engage the lower surface 246. The annular bumps 244 provide separation between the upper surface of the horizontal section 240 and the surface 246 to inhibit heat transfer their from. The section 240 further has a perimeter portion 250 that is adapted to rest upon the flange member 232 of the first member 224. Further, the rigid perimeter portion 252 of the upper plate 254 is adapted to compress the perimeter portion is 250 and 232 described further herein.

The central column section 242 is located in the center region of the second member 226 and comprises a central column 260 having an upper region 262 and a lower region 264. The lower region 264 has a skirt area 266 having an upper surface 268, which is part of the wall 266. Located in the circumferential regions of the skirt 266, are passageways 268. The passageways are in communication with a chamber region 270 which is defined as the anterior open region between the upper surface 272 of the first member 224 and the lower surface indicated at 274 of the second member 226. The central column section 242 further has a second set of passageways indicated at 280 that are located at radial interval locations around the column or section. In one form, on one side of a horizontal plane that bisects the column section, the first set of openings 268 and are located. On the other side of the aforementioned horizontal plane, the passageways 280 are located. This positioning of the passageways forces product and air to circumferentially travel around the chamber region 270 inhibiting the flow and causing the chamber 270 to fill. Located in the upper region 262 is 80 annular flange 284 that is adapted to rest upon the upper lip 286.

In operation, one installing the two-piece and closure member the first piece 240 is first fitted around the cylindrical wall 230 and the second piece 226 is placed thereon so the centers of each piece are concentric. Thereafter, the upper plate or changed lid 254 is rotated about pin 255 so the annular flange portion 252 presses upon the circumferential regions 250 and 232. Thereafter, a circumferential clamping indicated at 290 is retrieved where the client 290 is a conventional design where it has a single pivot point (not shown) and a tangential clamping section so as the first and second member's 290a and 290b are forced together, the interior surface 292 has a concave shape which forces the annular region 252 toward the cylindrical wall 230. Thereafter, a lock 300 can be employed to insure the filter material as well as communication to the product is not tempered with.

The embodiment shown in FIG. 13 is particularly advantageous because the first and second members 224 and 226 can be casted by a two-piece cast as opposed to a three-piece cast. In a preferred form, the first and second members 224 and 226 are made from a pliable material such as rubber to provide flexibility. When a pressure surge occurs, and product flows through the first set of passageways 268, the chamber 270 partially or completely fills. If the pressure surge continues, product continues to flow through the openings 280 and potentially through the filter material 36 and through the pliable ring (or flexible annular member) 160 where the distal portion flexes downward and allows product to exit. When there is not a surge but product is either being loaded or offloaded, and air can travel to and from the tank indicated by arrow 302 and passes through the distal flexible portion of the flexible flange 160, through the force material 36 and next radially outward through openings 280 through chamber 270 and radially inward through openings 268 and finally through the central opening 234 and to the tank.

When products offloaded and a potential low-pressure occurs in the tank, the central region 235 of the first member 224 can be displaced downwardly and separate from the column section 242. This provides separation between the lower surface of the column section in the upper surface of the first member 224 and hence allows greater airflow to pass therethrough. This is particularly advantageous when extra airflow is required with less resistance to prevent a decrease pressure in the tank, which can cause a catastrophic collapse of the product tank.

In another form the present invention, the upper region 262 is in communication with a pressure variation source. In this embodiment, the force material 36 and cover or lid 38 are completely removed and a line extends from the upper portion 262 to the pressure variation source. In one form, the line can extend around circumferentially the outside of the tank and the source can be located at the bottom portion of the tank. When offloading product, the pressure variation source can supply compressed air to the upper member 262. When on loading product, the pressure variation source can supply a negative gauge pressure which would facilitate the input of product especially if the input line is at the lower portion of the tank and the input pressure source must fight hydrostatic pressure of product in the tank. The pressure variation source could include a filter system that filters out dust, debris, and bacteria.

While the invention is susceptible of various modifications and alternative forms, specific embodiments thereof have been shown by way of example in the drawings and will herein be described in detail. It s should be understood, however, that it is not intended to limit the invention to the particular forms disclosed, but, on the contrary, the intention is to cover all modifications, equivalents and alternatives falling within the spirit and scope of the invention as expressed in the appended claims.

What is claimed is:

1. A closure assembly for a containing structure, to hold liquid product, which containing structure defines a containing chamber for a liquid, and which has an opening, such as a manhole, defined by a ring structure, said assembly comprising:

an outside cover member having an outer perimeter portion adapted to be positioned adjacent said ring structure, and also having a main inner portion extending across said perimeter portion, said inner portion having a venting structure leading to ambient atmosphere;

a closure member adapted to be positioned in an operating location adjacent to said cover member, said closure member having an upper surface, a center location and a perimeter location where the upper surface has a positive slope from the center location to the perimeter location, the closure member further having an inner portion with an inner perimeter where vertical extensions are positioned and the inner portion is located below the venting structure;

said closure member being characterized in that it has a relaxed position where in its operating location and without external forces applied thereto, the inner portion is spaced downwardly from said venting structure to permit air flow through said first vent opening, said closure member having an upwardly deflected position where, with an upper surge force exerted upon said closure member, the vertical extensions of the closure member are positioned against said cover member with the closure member coming in closing relationship with the venting structure but still allowing communication between the containing structure and the ambient air;

said closure member being further characterized in that in its operating location the closure member provides a closure member vent opening spaced from said venting structure and leading to said containing chamber to permit air flow to and from said containing chamber to an area between said cover member and said closure member; whereby with the closure member in its operating location and in its relaxed position, said containing chamber can be vented to ambient atmosphere, and with a surge force exerted against said closure member, said closure member moves to its upwardly deflected partially closed position to allow moderate flow of liquid outwardly through said venting structure.

2. The closure assembly as recited in claim 1, wherein said closure member comprises a first generally laterally extending circumferential flange at said perimeter location, which in the operating position engages the ring structure, and a second downwardly and outwardly extending perimeter flange member which forms with said first flange member a passageway extending at least partly along said perimeter location, said closure member vent opening being formed in said first perimeter flange as a first closure member vent opening and communicating between said perimeter passageway and the area between said cover member and said closure member, said second perimeter flange having a second closure member vent opening leading from said containing chamber to said perimeter passageway.

3. The assembly as recited in claim 1, wherein said extensions are located radially outwardly from the center location of said closure member and are positioned at circumferentially spaced locations around at least a substantial portion of the inner perimeter of the inner portion of the closure member.

4. The assembly as recited in claim 3, where said extensions are at substantially point locations relative to a lateral dimension perpendicular to a radius from said center location so as to leave substantially unobstructed flow around said extensions in the area between the cover member and the closure member.

5. The assembly as recited in claim 3, wherein said extensions extend laterally relative to a lateral dimension perpendicular to a radius from the center location, whereby flow to and from a center location in the area between the cover member and the closure member has a circuitous path of flow around said extensions.

6. The assembly as recited in claim 1, wherein said venting structure comprises a generally vertically aligned perimeter wall defining a vertical vent passageway and having a lower perimeter edge portion positioned above said inner portion of the closure member in its relaxed position, with said perimeter wall having a plurality of vent openings therein and leading to ambient atmosphere.

7. The assembly as recited in claim 6, wherein said perimeter wall is a first inner perimeter wall, and said venting structure further comprises a second outer perimeter wall surrounding said inner perimeter wall and defining an annular region between said inner and outer said perimeter walls, said annular region having a filter material therein.

8. The assembly as recited in claim 7, wherein there is a flexible annular member positioned below said annular region with the filter material therein, said flexible annular member being arranged to be able to be displaced vertically up or down to allow air or product to flow therearound.

9. The assembly as recited in claim 1, wherein said closure member comprises a first upper closure member and a second lower closure member spaced vertically from one another and defining there between a closure member chamber region, said closure member having a vertical inner perimeter wall portion positioned at a central location in said closure member chamber region, said vertical perimeter wall portion having at least one opening therein communicating with said venting structure.

10. The assembly as recited in claim 9, wherein said vertical perimeter portion in the closure member chamber region has a horizontal wall, and there is at least one opening in said vertical perimeter portion below said horizontal wall leading from the containing chamber into the closure member chamber region.

* * * * *